US008991037B2

(12) United States Patent
Suzumura et al.

(10) Patent No.: US 8,991,037 B2
(45) Date of Patent: Mar. 31, 2015

(54) WORKPIECE POSITIONING DEVICE AND PRODUCTION SYSTEM USING IT

(75) Inventors: Kazuki Suzumura, Kitakyushu (JP); Takahiko Kanamori, Kitakyushu (JP); Tomoyuki Shiraki, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 181 days.

(21) Appl. No.: 13/301,790

(22) Filed: Nov. 22, 2011

(65) Prior Publication Data
US 2012/0148377 A1    Jun. 14, 2012

(30) Foreign Application Priority Data

Dec. 10, 2010    (JP) .................................. 2010-275312

(51) Int. Cl.
*B62D 65/02*    (2006.01)
*B62D 65/18*    (2006.01)

(52) U.S. Cl.
CPC .............. *B62D 65/024* (2013.01); *B62D 65/18* (2013.01)
USPC ........................................................ 29/791

(58) Field of Classification Search
CPC .............. B66F 5/02; B66F 7/02; B66F 7/065; B66F 7/08; B66F 7/0641; B65F 5/04; B66C 23/48; B62D 65/18; B62B 4/06525; B62B 4/0612; B60S 9/04; B60S 9/10; B60S 9/12
USPC .................. 29/281.1, 281.3, 97.2, 559, 281.4, 29/281.5, 281.6; 254/8 B, 8 C, 2 B, 2 C, 254/11–17, 89 R, 422, 423, 424, 49, 90, 91
See application file for complete search history.

(56) References Cited

U.S. PATENT DOCUMENTS

| 6,467,675 | B1 | 10/2002 | Ozaku et al. |
| 6,687,971 | B2 | 2/2004 | Nakamura |
| 7,469,473 | B2 * | 12/2008 | Savoy .......................... 29/897.2 |
| 2001/0013164 | A1 * | 8/2001 | Morel et al. ................. 29/281.5 |
| 2005/0035175 | A1 | 2/2005 | Nakamura et al. |
| 2008/0000069 | A1 | 1/2008 | Savoy |
| 2008/0083913 | A1 * | 4/2008 | Fang et al. .................... 254/8 B |

(Continued)

FOREIGN PATENT DOCUMENTS

| DE | 202004017881 U1 | 3/2006 |
| EP | 1074460 | 2/2001 |
| JP | 62-113660 | 5/1987 |

(Continued)

OTHER PUBLICATIONS

Japanese Decision of a Patent Grant for corresponding JP Application No. 2010-275312, Dec. 4, 2012.

(Continued)

*Primary Examiner* — Alexander P Taousakis
*Assistant Examiner* — Lee A Holly
(74) *Attorney, Agent, or Firm* — Mori & Ward, LLP

(57) ABSTRACT

A workpiece positioning device according to an embodiment includes a first moving unit that is movable in a horizontal direction, a second moving unit that is movable in a vertical direction, and a rotating unit that is placed on either an upper end or a lower end of the second moving unit. The second moving unit and the rotating unit are kept within the width of the first moving unit that is perpendicular to the moving direction of the first moving unit on a horizontal plane.

12 Claims, 5 Drawing Sheets

(56) References Cited

U.S. PATENT DOCUMENTS

| | | | |
|---|---|---|---|
| 2009/0014700 A1* | 1/2009 | Metcalf et al. | 254/8 B |
| 2010/0107814 A1* | 5/2010 | Tominaga et al. | 74/840 |

FOREIGN PATENT DOCUMENTS

| | | |
|---|---|---|
| JP | 04-013529 | 1/1992 |
| JP | 09-011073 | 1/1997 |
| JP | 2001-047327 | 2/2001 |
| JP | 2002-263965 | 9/2002 |
| JP | 2006-007355 | 1/2006 |
| JP | 2009-208187 | 9/2009 |
| WO | WO 2008/002955 | 1/2008 |
| WO | WO 2009034817 A1 * | 3/2009 |

OTHER PUBLICATIONS

Japanese Office Action for corresponding JP Application No. 2010-275312, Sep. 25, 2012.
Extended European Search Report for corresponding EP Application No. 11192500.4-1268, Jun. 13, 2012.
Chinese Office Action for corresponding CN Application No. 201110404148.8, Jul. 14, 2014.
Korean Office Action for corresponding KR Application No. 10-2011-0131001, Aug. 11, 2014.

* cited by examiner

FIG.1
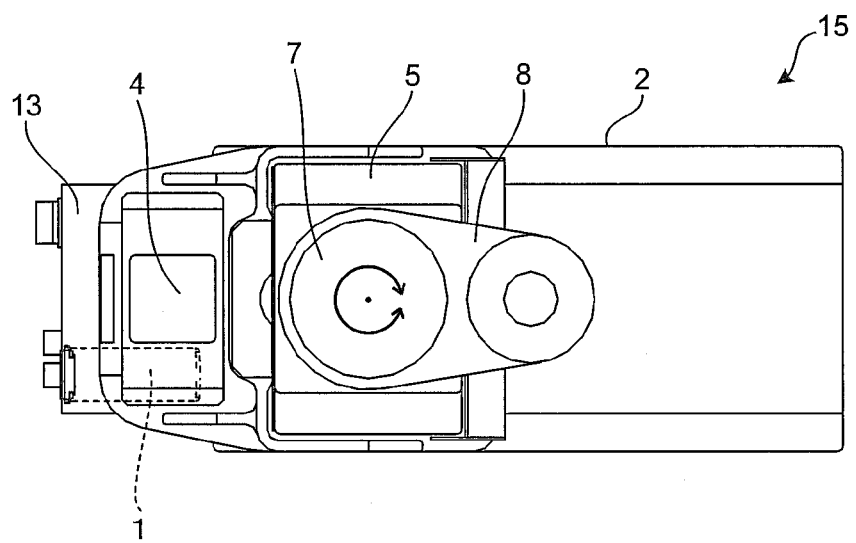
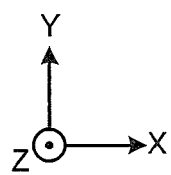

WORKPIECE POSITIONING DEVICE AND PRODUCTION SYSTEM USING IT

CROSS-REFERENCE TO RELATED APPLICATION

This application is based upon and claims the benefit of priority from the prior Japanese Patent Application No. 2010-275312, filed on Dec. 10, 2010, the entire contents of which are incorporated herein by reference.

FIELD

The embodiment discussed herein is directed to a workpiece positioning device and a production system using the device.

BACKGROUND

Industrial robots are conventionally provided on production lines of a factory in manufacturing industries. In order to make such the industrial robot accurately perform the same repetitive task on conveyed workpieces, it is necessary to fix the workpieces at a determined location each time. In order to make one production line correspond to the fixation of various kinds of workpieces, a workpiece positioning device disclosed in Japanese Laid-open Patent Publication No. 2002-263965 employs an orthogonal three-axis mechanism.

In the case of the auto industry, for example, because a workpiece such as a body of an automobile is larger than a workpiece positioning device in many cases, four to eight workpiece positioning devices are usually used to fix one workpiece. Therefore, a production line, on which a plurality of orthogonal three-axis workpiece positioning devices jointly performs a work task, has a problem in that it is difficult to save a space and thus to reduce a footprint for a process area.

SUMMARY

A workpiece positioning device according to an aspect of the embodiment includes a first moving unit that is movable in a horizontal direction, a second moving unit that is movable in a vertical direction, and a rotating unit that is placed on either an upper end or a lower end of the second moving unit. The second moving unit and the rotating unit are kept within a width of the first moving unit that is perpendicular to a moving direction of the first moving unit on a horizontal plane.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 1 is a plan view of a workpiece positioning device according to an embodiment;

DESCRIPTION OF EMBODIMENT

A workpiece positioning device according to an aspect of the embodiment includes a first moving unit that is movable in a horizontal direction, a second moving unit that is movable in a vertical direction, and a rotating unit that is placed on either an upper end or a lower end of the second moving unit. The second moving unit and the rotating unit are kept within a width of the first moving unit that is perpendicular to a moving direction of the first moving unit on a horizontal plane.

Figure 2:
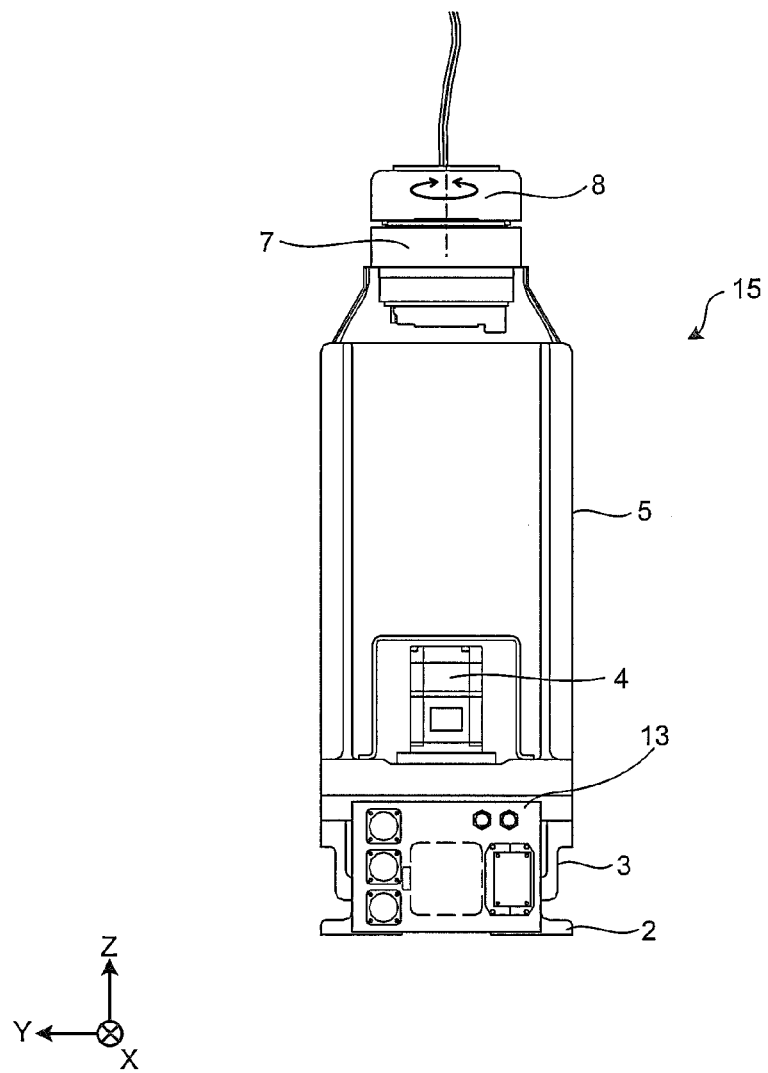
FIG. 2 is a side view of the workpiece positioning device according to the embodiment.
Figure 3:
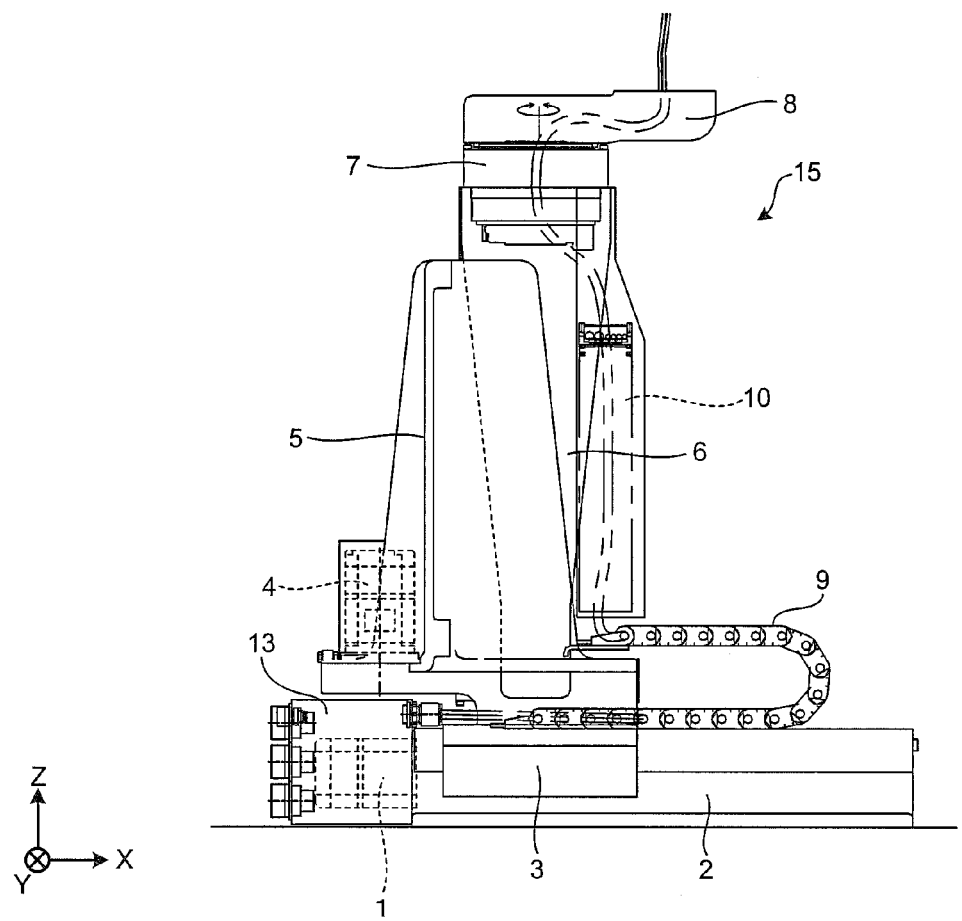
FIG. 3 is a front view of the workpiece positioning device according to the embodiment.

A workpiece positioning device according to an embodiment will be specifically explained with reference to FIGS. 1 to 3. FIG. 1 is a plan view of a workpiece positioning device 15 according to the embodiment. FIG. 2 is a side view of the workpiece positioning device 15 according to the embodiment. FIG. 3 is a front view of the workpiece positioning device 15 according to the embodiment.

The workpiece positioning device 15 according to the embodiment includes an X-axis frame 2 and an X-axis movable unit 3. The X-axis frame 2 is fixed on a floor. The X-axis frame 2 is provided with a ball screw not illustrated (hereinafter, "X-axis ball screw") and an X-axis guide rail not illustrated (hereinafter, "X-axis guide rail"). The X-axis movable unit 3 is attached to a nut of the X-axis ball screw to be guided by the X-axis guide rail in an X-axis direction. A connector box 13 is placed at one end of the X-axis frame 2 and below a Z-axis frame 5. The connector box 13 includes therein an X-axis motor 1 that acts as a driving source for rotating the X-axis ball screw. A rotational motion of the X-axis motor 1 is converted into a linear motion of the X-axis direction by the X-axis ball screw and the X-axis guide rail. As a result, the X-axis movable unit 3 moves in the X-axis direction. In this way, the workpiece positioning device 15 includes a first moving unit that includes the X-axis frame 2 and the X-axis movable unit 3 and is movable in a horizontal X-axis direction. In the present embodiment, a Y-axis direction, which is a direction perpendicular to the moving direction (X-axis direction) of the X-axis movable unit 3 on a horizontal plane, is the width direction of the X-axis frame 2 and the X-axis movable unit 3. Herein, the X-axis frame 2 and the X-axis movable unit 3 are formed to have the same width.

The Z-axis frame 5 is placed on the X-axis movable unit 3. Moreover, the Z-axis frame 5 is formed in such a manner that the width of the Z-axis frame 5 for the X-axis direction that is the traveling direction of the X-axis movable unit 3 is the same as that of the X-axis frame 2 or is smaller than that of the X-axis frame 2. In other words, when a Y-axis direction is a width direction of the Z-axis frame 5, the width of the Z-axis frame 5 is kept within the width of the X-axis frame 2. The Z-axis frame 5 is provided with a ball screw not illustrated (hereinafter, "Z-axis ball screw") and a guide rail not illustrated (hereinafter, "Z-axis guide rail"). A Z-axis movable unit 6 is attached to a nut of the Z-axis ball screw to be guided by the Z-axis guide rail in a Z-axis direction. The Z-axis movable unit 6 is attached to the foreside of the Z-axis frame 5. Furthermore, a Z-axis motor 4 that acts as a driving source for rotating the Z-axis ball screw is placed at the backside of the Z-axis frame 5. A rotational motion of the Z-axis motor 4 is converted into a linear motion of the Z-axis direction by the Z-axis ball screw and the Z-axis guide rail. As a result, the Z-axis movable unit 6 moves in the Z-axis direction. In this way, the workpiece positioning device 15 further includes a second moving unit that includes the Z-axis frame 5 and the Z-axis movable unit 6 and is movable in a vertical Z-axis direction.

A hollow actuator 7 as disclosed in International Publication Pamphlet No. WO2009/034817 is placed on an upper end of the Z-axis movable unit 6 as a rotating unit. An output shaft of the hollow actuator 7 is a rotation axis parallel to the Z-axis.

The diameter of the hollow actuator 7 is the same as or smaller than the width-direction length of the X-axis frame 2, in which the width direction is a direction against the traveling direction of the X-axis movable unit 3 when the traveling direction is the X-axis direction. A flange 8 is attached to the output shaft of the hollow actuator 7. Along with a rotation of the output shaft of the hollow actuator 7, the flange 8 revolves around an axis parallel to Z-axis. The original point of the hollow actuator 7 is a position at which the longitudinal direction axis line of the flange 8 and the traveling direction axis line of the X-axis movable unit 3 have the same direction, in which the traveling direction of the X-axis movable unit 3 is the X-axis direction. In this case, when the rotation position of the hollow actuator 7 is at the original point, the position of the flange 8 becomes an initial state position.

The width-direction length of the flange 8 is the same as or smaller than the width-direction length of the X-axis frame 2, in which the width direction is a direction against the traveling direction of the X-axis movable unit 3 when the traveling direction is the X-axis direction. In other words, when the width direction of the flange 8 located at the initial state is the Y-axis direction, the width of the flange 8 is kept within the width of the X-axis frame 2.

Furthermore, the longitudinal length of the flange 8 is one-half of the movable range of Y-axis. One end of the flange 8 is fixed to the output shaft of the hollow actuator 7 and the other end has an opening to which a jig that includes a contact sensor, a proximity switch, and the like is attached.

Next, a wiring structure will be explained. A cable of the X-axis motor 1, a cable of the Z-axis motor 4, and a cable of the hollow actuator 7, which drive the shafts from a control panel not illustrated, are attached to the connector box 13. The cable of the X-axis motor 1 is directly connected to a connector area of the X-axis motor 1. The cable of the Z-axis motor 4 is connected to a connector area of the Z-axis motor 4 via an X-axis cableveyor 9 attached to the top of the X-axis frame 2.

The cable of the hollow actuator 7 is connected to a connector area of the hollow actuator 7 via the X-axis cableveyor 9 similarly to the cable of the Z-axis motor 4 and then a Z-axis cableveyor 10 fixed to the Z-axis frame 5. A cable for activating the jig attached to the flange 8 passes through a hollow part of the hollow actuator 7.

Next, operations will be explained. A horizontal operation is performed by causing the X-axis ball screw engaged with the X-axis motor 1 by an X-axis coupling to slide the X-axis movable unit 3 in the X-axis direction when the X-axis motor 1 is driven. The horizontal operation is performed when X-axis direction positioning is performed.

A raising and lowering operation is performed by causing the Z-axis ball screw to raise and lower the Z-axis movable unit 6 by using a belt by which a pulley of the Z-axis motor 4 is engaged with a pulley of the Z-axis ball screw when the Z-axis motor 4 is driven. The raising and lowering operation is performed when Z-axis direction positioning is performed.

A rotation operation is performed by making the hollow actuator 7 rotate the flange 8 attached to its top in order to enable the Y-axis direction movement. The rotation operation is performed when Y-axis direction positioning is performed.

The workpiece positioning device 15 described above has a configuration that the device size is not larger than the width of the X-axis frame 2 and the Y-axis direction movement is realized by a rotation operation. Therefore, a footprint can be reduced. In other words, because the workpiece positioning device 15 has a configuration that the width of the second moving unit including the Z-axis frame 5 and the Z-axis movable unit 6 and the width of the hollow actuator 7 are kept within the width of the first moving unit that includes the X-axis frame 2 and the X-axis movable unit 3, a footprint can be reduced. In addition, because the workpiece positioning device 15 has a configuration that the width of the Z-axis frame 5 and the width of the hollow actuator 7 are kept within the width of the X-axis movable unit 3 when the width of the X-axis frame 2 is smaller than that of the X-axis movable unit 3, a footprint can be reduced.

In the present embodiment, it has been explained about the case where the Z-axis frame 5 is placed on the X-axis frame 2, and the hollow actuator 7 and the flange 8 for performing a rotation operation are placed on the Z-axis frame 5. However, the embodiment is not limited to this. For example, the workpiece positioning device can be realized by a configuration that the hollow actuator is placed on the X-axis frame, the Z-axis frame is placed on the hollow actuator, and the flange is attached to the distal end of the Z-axis frame.

Moreover, it has been explained about the case where each of the X-axis movable unit 3 and the Z-axis movable unit 6 includes a motor and a ball screw. However, the X-axis movable unit 3 and the Z-axis movable unit 6 can be replaced by, for example, a linear motor.

Although the embodiment has been described in detail, it should be understood that the various changes, substitutions, and alterations could be made hereto without departing from the spirit and scope of the invention.

Figure 4:
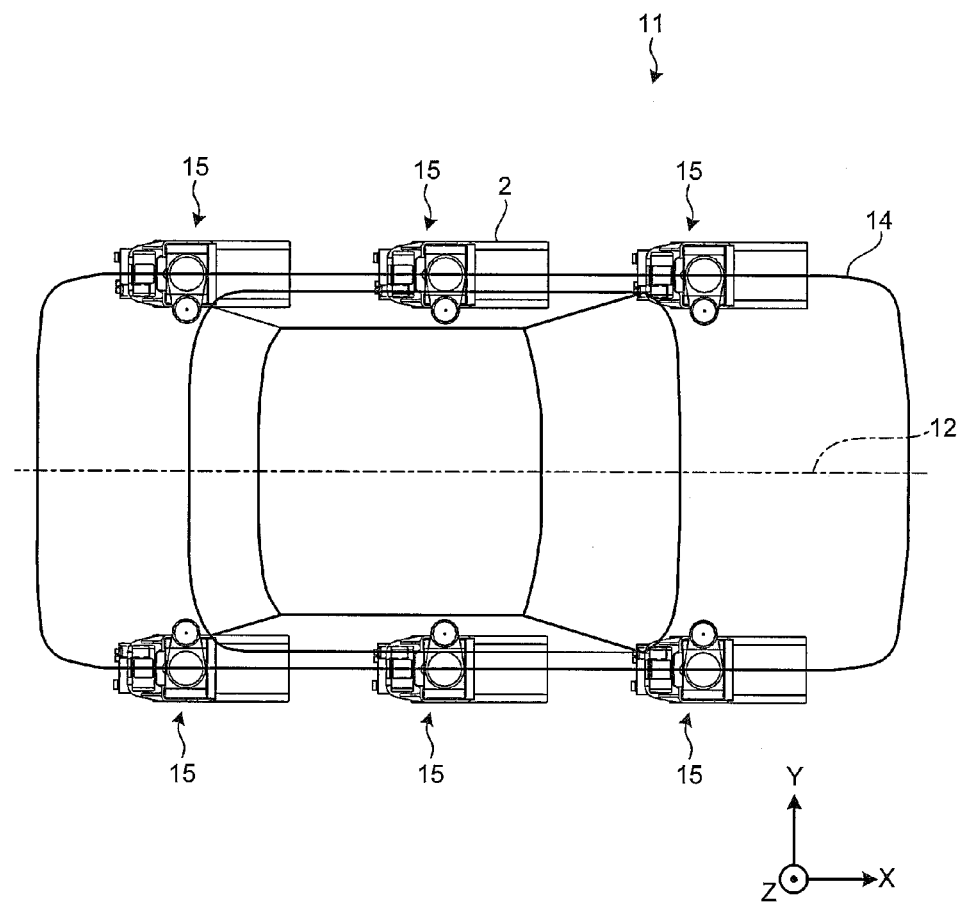
FIG. 4 is a plan view of a production system according to the embodiment.
Figure 5:
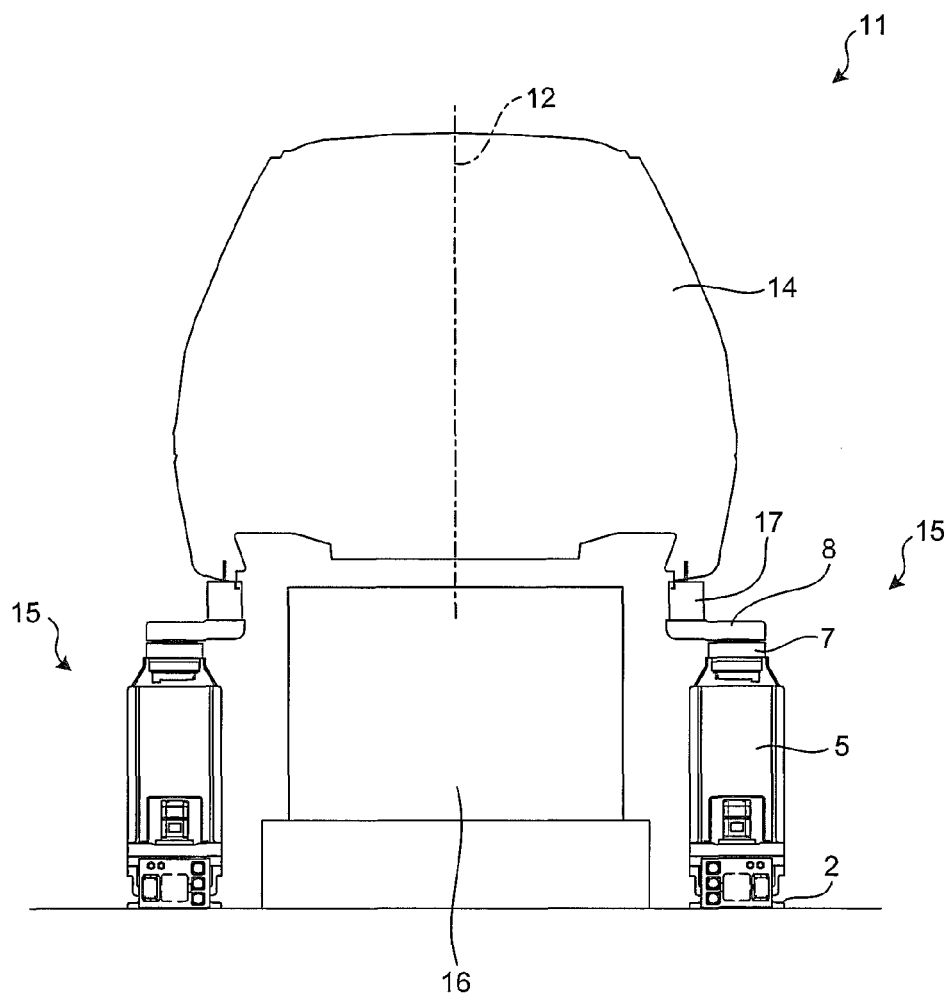
FIG. 5 is a side view of the production system according to the embodiment.

An example of a production system that uses the workpiece positioning devices 15 will be explained with reference to FIGS. 4 and 5. FIG. 4 is a plan view of a production system 11 according to the embodiment. FIG. 5 is a side view of the production system 11 according to the embodiment. It will be explained about the production system that positions a body of an automobile corresponding to a workpiece 14 by using a workpiece conveying device 16.

As illustrated in FIG. 4, the production system 11 according to the embodiment has a configuration that the workpiece conveying device 16 that conveys the workpiece 14 extends in the X-axis direction and the workpiece positioning devices 15 are arranged at symmetric positions with a central focus on an X-axis direction axis line 12 in such a manner that the longitudinal direction of the X-axis frame 2 of each of the workpiece positioning devices 15 is the same as the conveyance direction of the workpiece 14 and the X-axis direction. For example, the present embodiment has a configuration that the six workpiece positioning devices 15 are arranged at symmetric positions with a central focus on the X-axis direction axis line 12 in which the three devices are located at one side of the symmetric positions.

As illustrated in FIG. 5, the workpiece positioning device 15 has a configuration that a workpiece positioning jig 17 is attached to the flange 8. In an initial state, the height of the workpiece positioning jig 17 is lower than that of the workpiece conveying device 16.

The workpiece positioning device 15 is placed in such a manner that the longitudinal direction of the X-axis frame 2 is the same as the conveyance direction of the workpiece 14 and the X-axis direction. When the flange 8 is rotated by the hollow actuator 7, the workpiece positioning jig 17 is placed near the workpiece conveying device 16 in a state where the workpiece positioning jig 17 does not contact the workpiece conveying device 16.

In the present embodiment, it has been explained about the case where the workpiece positioning devices 15 are arranged at symmetric positions because a symmetric workpiece is used. However, the embodiment is not limited to this. For example, when a workpiece has an asymmetric shape or a workpiece has a space in its edge, the workpiece positioning devices 15 may be appropriately arranged in such a manner that a centroid balance is located at the central portion of a workpiece. In other words, the number of the workpiece positioning devices 15 located at one side of symmetric sides may be different from the number of the workpiece positioning devices 15 located at the other side.

Next, operations will be explained. The workpiece 14 is mounted on and conveyed by the workpiece conveying device 16. The workpiece conveying device 16 is, for example, a conveyer or a movable carriage. When the workpiece is conveyed by the workpiece conveying device 16 at a predetermined position, the hollow actuator 7 rotates at a predetermined angle and thus the workpiece positioning jig 17 is placed below the workpiece 14.

Next, the X-axis movable unit 3 drives to operate horizontally and thus the workpiece positioning jig 17 is placed below the attachment position of the workpiece 14. Next, the Z-axis movable unit 6 drives to operate vertically and thus the workpiece positioning jig 17 is mounted at the attachment position of the workpiece 14.

Each of the workpiece positioning devices 15 drives the X-axis movable unit 3, the Z-axis movable unit 6, and the hollow actuator 7 to the set positions in accordance with commands of a controller not illustrated if desired, in order to adjust and determine the position of the workpiece 14.

The six workpiece positioning devices 15 employed in the present embodiment sequentially perform a series of operations for mounting the workpiece positioning jigs 17 on the workpiece 14 but synchronously perform the operations of the Z-axis movable units 6 for mounting the workpiece positioning jigs 17 on the workpiece 14. Therefore, the workpiece positioning jigs 17 are activated to be substantially simultaneously mounted on the workpiece 14. As a result, the workpiece 14 is positioned by the workpiece positioning devices 15.

The workpiece positioning devices 15 can appropriately position the workpiece in such a manner that a centroid balance is located at the central portion of the workpiece by performing operations as described above even when a workpiece has an asymmetric shape or has a space in its edge.

After the workpiece 14 is positioned, the workpiece 14 is processed by a robot such as a welding robot or a sealing robot that is placed at the periphery of the workpiece. After the work is completed, the workpiece positioning devices 15 are detached from the workpiece 14 and are transferred by the workpiece conveying device 16 to the following process.

As described above, because the production system has the configuration that the workpiece positioning devices 15 are arranged to position a workpiece, the production system can reduce a footprint. Moreover, because the workpiece positioning device 15 according to the embodiment performs a movement in a direction (Y-axis direction) perpendicular to the conveyance direction of the workpiece 14 on a horizontal plane by using a rolling mechanism, the production system can be constituted by the same type workpiece positioning devices. On the other hand, when orthogonal three-axis workpiece positioning devices are employed as before, two-type units having different configurations are prepared to arrange the devices at facing positions against the traveling direction of a workpiece.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A workpiece positioning device comprising:
   a first moving unit that is movable in a horizontal longitudinal direction;
   a second moving unit that is attached to the first moving unit and is movable in a vertical direction;
   a rotating unit that is placed on either an upper end or a lower end of the second moving unit, the rotating unit having an output shaft with an axis that, when viewed along the vertical direction, extends through a substantial center of the first moving unit in a horizontal sideways direction, the horizontal sideways direction being perpendicular to the horizontal longitudinal direction; and
   a flange member that is attached to the output shaft of the rotating unit to rotate about the output shaft, wherein
   a width of the flange member that is kept within a width of the first moving unit in the horizontal sideways direction,
   a length of the flange member is longer than the width of the flange member,
   the rotating unit rotates and positions the flange member in the horizontal sideways direction, and
   the second moving unit and the rotating unit are provided within a width in the horizontal sideways direction of the first moving unit.

2. The workpiece positioning device according to claim 1, wherein
   the flange member is located in an initial state in a same direction as the moving direction of the first moving unit.

3. A production system comprising:
   a workpiece;
   a workpiece conveying device that mounts thereon the workpiece;
   a processing device that processes the workpiece; and
   workpiece positioning devices of which each positions the workpiece and includes a first moving unit that is movable in a horizontal longitudinal direction, a second moving unit that is attached to the first moving unit and is movable in a vertical direction, a rotating unit that is placed on either an upper end or a lower end of the second moving unit, the rotating unit having an output shaft with an axis that, when viewed along the vertical direction, extends through a substantial center of the first moving unit in a horizontal sideways direction, the horizontal sideways direction being perpendicular to the horizontal longitudinal direction, and a flange member that is attached to the output shaft of the rotating unit to rotate about the output shaft, wherein
   positioning in the horizontal sideways direction is performed by rotating the flange member,
   a longitudinal length of the flange member is one-half of a movable range of the flange member in the horizontal sideways direction,
   the second moving unit and the rotating unit are provided within a width in the horizontal sideways direction of the first moving unit,
   the workpiece positioning devices are arranged at both sides in a moving direction of the workpiece, and
   the workpiece positioning devices are arranged in such a manner that a longitudinal direction of the first moving unit of the workpiece positioning device is a same as the moving direction of the workpiece.

4. The production system according to claim 3, wherein the workpiece positioning devices are arranged at the both sides in the moving direction of the workpiece in such a manner that a centroid position of the workpiece is located at a central portion of the workpiece.

5. The production system according to claim 3, wherein the workpiece positioning devices are symmetrically arranged about the moving direction of the workpiece.

6. The production system according to claim 3, wherein the workpiece positioning devices arranged at the both sides in the moving direction of the workpiece synchronously operate vertically when being mounted on the workpiece and adjust a position of the workpiece to a predetermined position.

7. A workpiece positioning device comprising:
- a first moving unit that is movable in a horizontal longitudinal direction;
- a second moving unit that is attached to the first moving unit and is movable in a vertical direction;
- a rotating unit that is placed on either an upper end or a lower end of the second moving unit, the rotating unit having an output shaft with an axis that, when viewed along the vertical direction, extends through a substantial center of the first moving unit in a horizontal sideways direction, the horizontal sideways direction being perpendicular to the horizontal longitudinal direction; and
- a flange member that is attached to the output shaft of the rotating unit to rotate about the output shaft, wherein
- the rotating unit rotates and positions the flange member in the horizontal sideways direction,
- the second moving unit and the rotating unit are provided within a width in the horizontal sideways direction of the first moving unit, and
- at least one of the first moving unit and the second moving unit is driven by a mechanism that converts a rotation of a motor into a linear motion.

8. A workpiece positioning device comprising:
- a first moving unit that is movable in a horizontal longitudinal direction;
- a second moving unit that is attached to the first moving unit and is movable in a vertical direction;
- a rotating unit that is placed on either an upper end or a lower end of the second moving unit, the rotating unit having an output shaft with an axis that, when viewed along the vertical direction, extends through a substantial center of the first moving unit in a horizontal sideways direction, the horizontal sideways direction being perpendicular to the horizontal longitudinal direction; and
- a flange member that is attached to the output shaft of the rotating unit to rotate about the output shaft, wherein
- the rotating unit rotates and positions the flange member in the horizontal sideways direction,
- the second moving unit and the rotating unit are provided within a width in the horizontal sideways direction of the first moving unit, and
- the rotating unit is configured with is hollow actuator, and a wiring communicated with the second moving unit is communicated with a hollow part of the hollow actuator.

9. A workpiece positioning device comprising:
- a first moving unit that is movable in a horizontal longitudinal direction;
- a second moving unit that is attached to the first moving unit and is movable in a vertical direction;
- a rotating unit that is placed on either an upper end or a lower end of the second moving unit, the rotating unit having an output shaft with an axis that, when viewed along the vertical direction, extends through a substantial center of the first moving unit in a horizontal sideways direction, the horizontal sideways direction being perpendicular to the horizontal longitudinal direction; and
- a flange member that is attached to the output shaft of the rotating unit to rotate about the output shaft, wherein
- the rotating unit rotates and positions the flange member in the horizontal sideways direction,
- the second moving unit and the rotating unit are provided within a width in the horizontal sideways direction of the first moving unit, and
- the positioning in the horizontal sideways direction is performed by rotation of the flange member and horizontal longitudinal movement of the first moving unit.

10. The production system according to claim 3, wherein the positioning in the horizontal sideways direction is performed by rotation of the flange member and horizontal longitudinal movement of the first moving unit.

11. The workpiece positioning device according to claim 1, wherein the axis, when viewed along the vertical direction, extends through and remains at the substantial center of the first moving unit in the horizontal sideways direction during movement of the first moving unit, during movement of the second moving unit, and during rotation of the rotating unit.

12. The production system according to claim 3, wherein the axis, when viewed along the vertical direction, extends through and remains at the substantial center of the first moving unit in the horizontal sideways direction during movement of the first moving unit, during movement of the second moving unit, and during rotation of the rotating unit.

* * * * *